US006687218B1

(12) United States Patent
Kendig

(10) Patent No.: US 6,687,218 B1
(45) Date of Patent: Feb. 3, 2004

(54) CONFIGURABLE COMMUNICATION OUTPUT REDUNDANCY

(75) Inventor: Stephen D Kendig, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/410,369

(22) Filed: Sep. 30, 1999

(51) Int. Cl.[7] .............................................. H04L 12/26
(52) U.S. Cl. ....................................... 370/217; 370/221
(58) Field of Search ................................ 370/216, 217, 370/218–220, 241, 242, 244, 250, 407; 714/1, 2, 9, 10; 327/407; 375/258, 220

(56) References Cited

U.S. PATENT DOCUMENTS

| 5,640,402 | A | * | 6/1997 | Motika et al. ............... 714/731 |
| 5,983,298 | A | * | 11/1999 | Schultz et al. ............... 710/302 |
| 6,115,517 | A | * | 9/2000 | Shiragaki et al. ............. 385/24 |
| 6,259,978 | B1 | * | 7/2001 | Feely ........................... 701/19 |
| 6,308,290 | B1 | * | 10/2001 | Forlenza et al. ............. 714/724 |
| 6,327,685 | B1 | * | 12/2001 | Koprowski et al. ......... 714/733 |
| 6,370,604 | B1 | * | 4/2002 | Sreekanti .................... 710/302 |
| 6,378,084 | B1 | * | 4/2002 | Strunk et al. .................. 714/2 |
| 6,425,009 | B1 | * | 7/2002 | Parrish et al. ............... 709/224 |
| 6,490,702 | B1 | * | 12/2002 | Song et al. .................. 714/726 |

* cited by examiner

Primary Examiner—Seema S. Rao
Assistant Examiner—Melanie Jagannathan

(57) ABSTRACT

The invention is a communication system having a series of output modules that provide continuous synchronization output signals. Each output module has a driver assembly that has a driver output and a backup selector output that is capable of driving a failed next driver assembly. The driver output and the backup selector output can be different types. A sensor detects the failure of the driver or a backup driver output and generates a select signal in the failure state. A selector receives the driver output, the backup driver output, the select signal, and a select signal from the next driver assembly. The selector normally selects the driver output, but in response to a failure state from the select signal, isolates the failed driver output. The previous driver assembly transmits a backup selector output to the failed driver assembly to maintain a continuous driver output. The transformers are preferably placed on a separate card to reduce the thermal degradation of nearby electronics. As transformers rarely fail, replacing them when a card fails is wasteful. The driver assemblies are identical, only one type of driver assembly need be stocked. Fast protection switching, high output utilization and low power consumption are achieved in this invention.

20 Claims, 6 Drawing Sheets

_US 6,687,218 B1_

CONFIGURABLE COMMUNICATION OUTPUT REDUNDANCY

FIELD OF INVENTION

The invention is directed towards telecommunication and data communication applications. In particular, the invention is directed towards providing a fast switchover protection of communication outputs in these applications.

BACKGROUND

A communication system is a network of central offices connected by high-speed fiber optic lines. A Cesium (Cs) clock or global positioning system (GPS) signal at each central office synchronizes the communications. Communications networks further branch from the central offices and use lower speed connections. A building integration timing system (BITS) or BITS clock also called a network synchronization supply unit (SSU), is an electronics box at the central office that produces a timing or synchronization output signal connected to all the other network transmission and switching equipment in the office. A SSU contains a series of plug-in electronics cards including: an information management card (IMC), two input track and hold (ITH) cards or clock cards, one clock card for redundancy, with input from a Cs clock or GPS, and a series of output cards. The IMC, clock cards, and output cards connect to a backplane in the SSU. The output cards receive timing signals from the clock cards. The output cards have a power supply, electronics to communicate to the clock cards via the backplane, and a driver circuit that drives a transformer to produce the synchronization output signal. The output cards can have different types of synchronization output signals, e.g. DS0 or composite clock (CC), DS1 or T1, RS-422, and E1. DS0 operates at 64 Kb/sec. DS1 operates at 1.544 Mb/sec. RS-422 operates at various frequencies. E1 operates at 2.048 Mb/sec. DS1 and DS0 are common output types in the United States. E1 is common in Europe. These precise synchronization output signals are received by the other network elements, such as add/drop multiplexers (ADM), which carry the actual transmitted signals or data, called traffic. The synchronization output signals ensure that all out going transmissions from the central office have the same average frequency as the rest of the network.

It is important in data and telecommunication systems that synchronization output signals continue without loss in the event of a failure of an output card. Failure of an output card includes not only the actual failure of the card but also the accidental removal of a functioning card by a user. Replacement of output cards while the SSU is operating is called 'hot swapping'.

N:1 is a prior art method of protecting outputs. There is one 'hot' spare output card for each type of output that can be switched in by a multiplexer if a failure occurs in one of the N output cards. Most slots in the SSU are filled with cards that have an output so there is a high utilization of outputs. For example, if the SSU has twenty slots for output cards and the MMC and two 'hot' spares occupy three, then there is an output utilization of 85%. Power efficiency is also about 85% since three out of the twenty cards consume power without producing an output. The switching is very slow because the multiplexer is an array of mechanical switches or relays. The switching time for the relays within the multiplexer is typically a few milliseconds. E1 output waveforms have a period of around 500 ns. This switching time results in the loss of several periods of output waveform. This is undesirable for most applications. The number of usable outputs is limited because a 'hot' spare must be kept for each output type. The switching increases in complexity for more than two output types. Only one output card is protected at a time, if another output card of the same output type fails before the first can be 'hot swapped', then that output signal is lost.

1:1 is another prior art method of output protection. There is one spare output card in a standby state for each output card. Half of the output cards in the SSU are not producing an output so there is only a 50% output utilization. Only the cards with outputs consume power so that the power efficiency is nearly 100%. The 1:1 arrangement provides fast switching and each output card is protected. The switching speed can be as fast as 500 ns or only one period of an E1 waveform.

1+1 is a third prior art method of output protection. This method is similar to the 1:1 except that the spare is 'hot'. The 1+1 method has a 50% output utilization. Since all the output cards are consuming power and only half are producing outputs, the power efficiency is around 50%. The switching is very fast and each output card is protected. It is possible for the switch over to be nearly instantaneous if the output card fails in a open state. If the output card fails in the closed or shorted state, then the output card will have to be isolated and this can take 500 ns.

Prior art output cards have transformers generating heat and increasing the temperature of the output card. This can lead to accelerated failures of the more temperature sensitive components. The transformers themselves are very robust and rarely fail, yet they are replaced along with the rest of the output card when it fails. This is wasteful and costly.

SUMMARY

The invention is a communication system having a series of output modules, each having a continuous synchronization output signal. Each output module has a driver assembly that has a driver output and a backup selector output that is capable of driving a failed next adjacent driver assembly. The driver assemblies have a power supply, microprocessor, field programmable gate array (FPGA), driver circuits and backup driver circuits. A sensor detects the failure of the driver or a backup driver output and generates a select signal in the failure state. A selector receives the driver output, the backup driver output, the select signal, and a select signal from the next adjacent driver assembly. The selector normally selects the driver output, but in response to a failure state from the select signal, the selector isolates the failed driver output. The previous adjacent driver assembly transmits a backup selector output to the failed driver assembly to maintain a continuous driver output. The first and the last output modules may be connected together so that each output is protected.

Protection switching is fast and each of the N output modules is protected. Output utilization is very high for this synchronization supply unit (SSU). The adjacent output module need not be of the same output type for the adjacent driver assembly to serve as protection, because the output module has a separate driver and backup driver. The output module is capable of simultaneously supplying two different output types. For example, a series of DS1 output modules can be adjacent to a series of DS0 output modules or the DS1 and DS0 output modules can even alternate. For a system with twenty output modules with any combination of output types, the SSU will have a 95% output utilization even if the first and last output modules of each series are not connected together. In this case, the one backup output module and all the backup drivers may be in the standby state for a power efficiency of nearly 100%. The backup drivers may be kept in standby or may be kept 'hot'. The backup driver shares the power supply and most of the electronics, such as a microprocessor and field programmable gate array (FPGA) with the driver. As a result, if the backup driver is 'hot', power consumption may increase by only 30%. In this case, the backup output module and all the backup drivers may be kept 'hot' for a power efficiency of around 70%.

The driver assembly contains the active circuitry and a transformer card contains the transformers. Placing the transformers on a separate card reduces the thermal degradation of nearby electronics. In addition, transformers rarely fail so replacing them when a card fails is wasteful. This novel driver assembly can drive a variety of synchronization output signals, replacing several types of conventional output cards. In another preferred embodiment, the backup driver can be placed on separate backup driver card, so that a failed backup driver can be replaced without replacing the drivers. In this case, both driver and backup driver cards are stocked. The invention allows for 'hot swapping' of driver assemblies. This makes replacement of failed drivers or backup drivers easy.

DETAILED DESCRIPTION OF THE PREFERRED EMBODIMENTS

Figure 1:
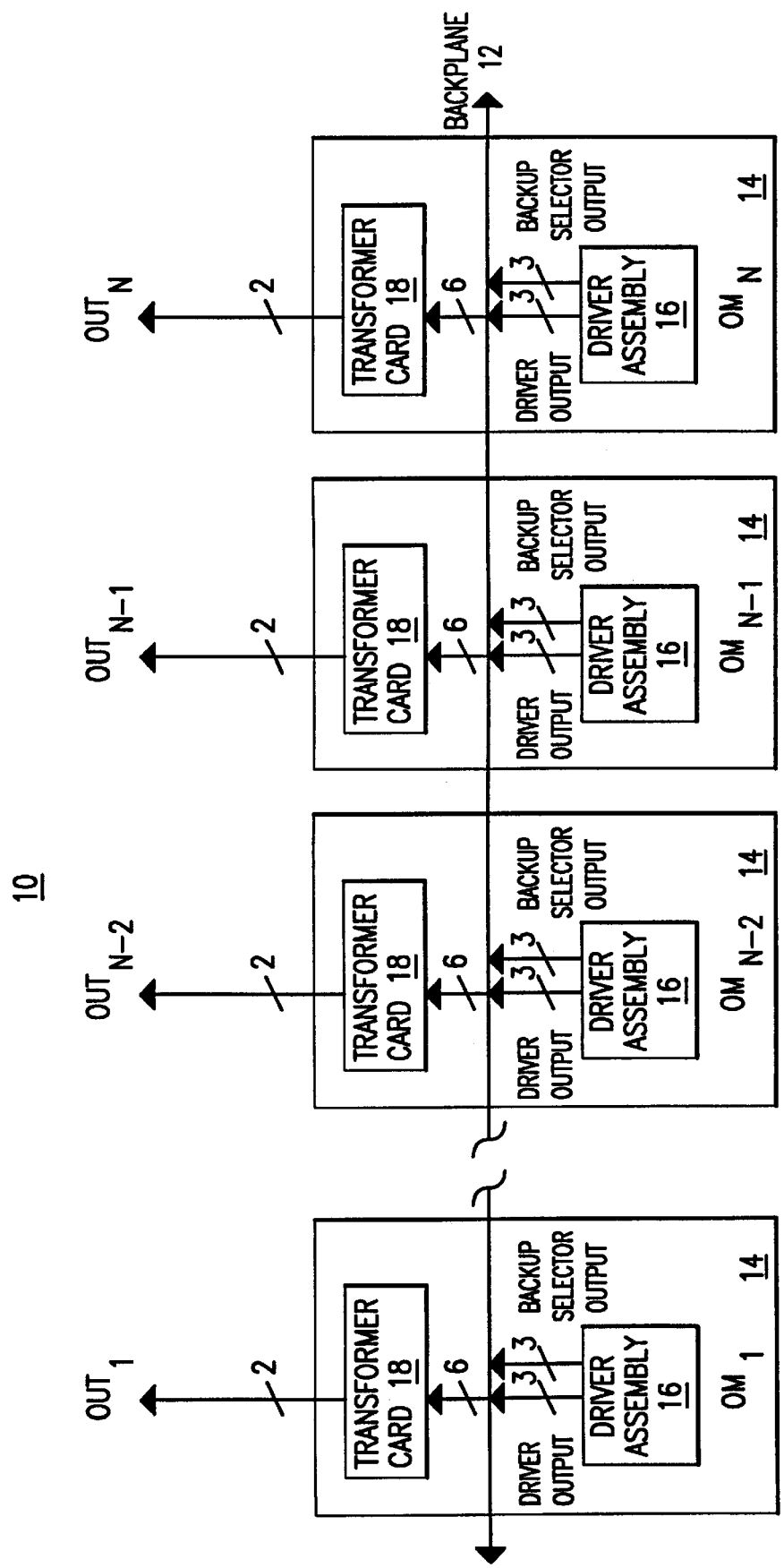
FIG. 1 is a block diagram of the preferred embodiment of the present invention.

FIG. 1 shows a preferred embodiment of the present invention. A series of N output modules 10 are connected via a backplane 12 interface. Each output module $OM_x$, 14 has a driver assembly 16 and a transformer card 18. Each transformer card 18 receives a six terminal input from the backplane 12 and generates a two terminal synchronization output signal $OUT_x$. Each driver assembly 16 produces a three terminal driver output that drives the transformer card 18 via a backplane 12 connection. Each driver assembly 16 also produces a three terminal backup selector output that connects to an adjacent output module 14 through the backplane 12 to create a daisy chain. Optionally, the backup selector output of the last output module 14 can connect to the first output module 14 to provide every synchronization output signal in the series with a backup selector output.

Figure 2:
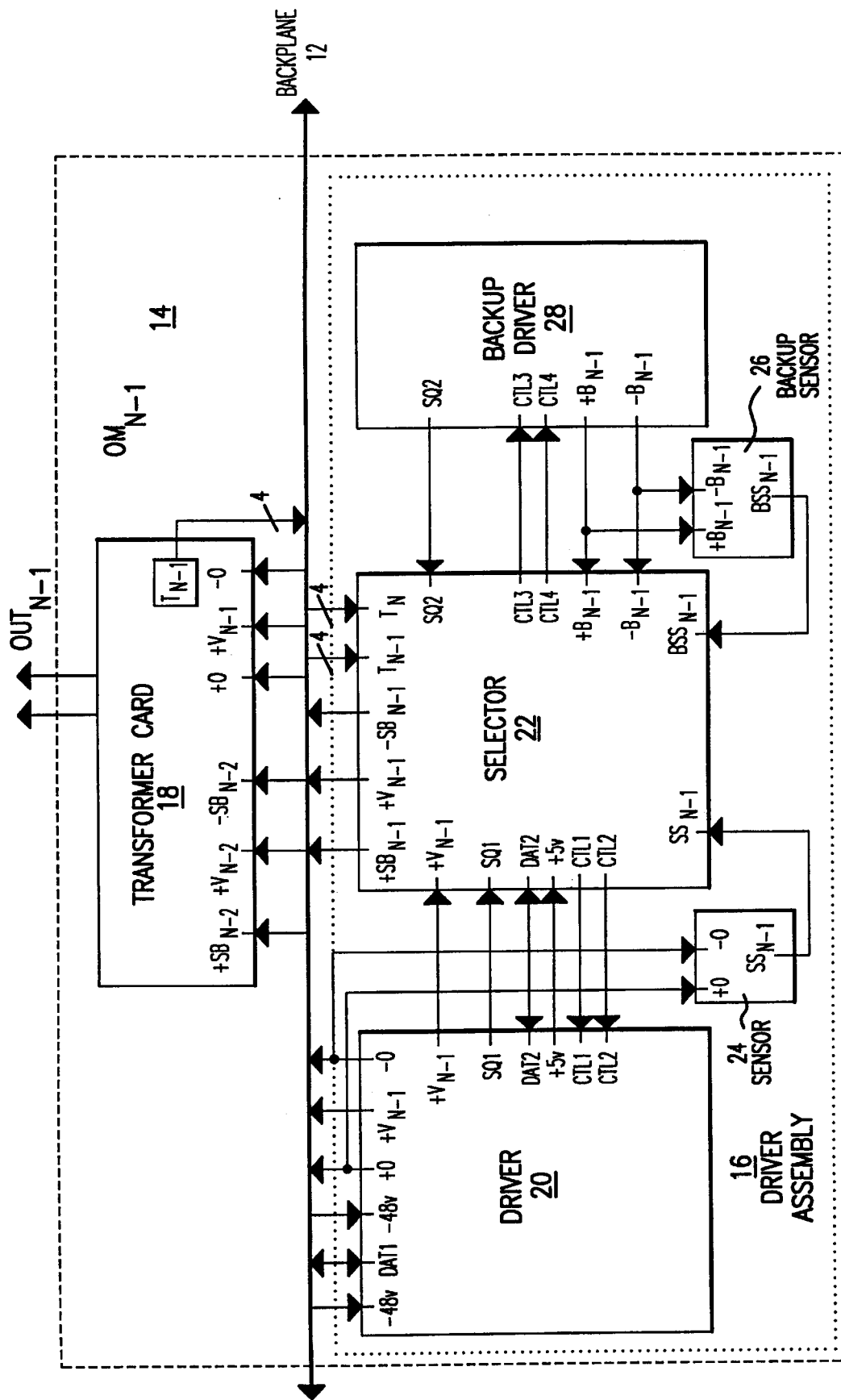
FIG. 2 is a block diagram of the output module of FIG. 1.

FIG. 2 shows a block diagram of a typical output module $OM_{N-1}$ 14 of FIG. 1. The driver assembly 16 has a driver 20, backup driver 28, selector 22, sensor 24 and backup sensor 26. The driver 20 produces outputs +O, +$V_{N-1}$, −O that connect to a transformer card 18 via the backplane 12. A backup driver 28 produces outputs +$B_{N-1}$, −$B_{N-1}$ that connect to the selector 22. The backup driver 28 also connects to the selector 22 with output SQ2 and inputs CTL3, CTL4. The driver 20 also connects to the backplane 12 through an interface DAT1 and −48v inputs. The driver 20 connects to the selector 22 with an interface DAT2, outputs +$V_{N-1}$, SQ1, and +5v, and receives inputs CTL1, CTL2. A sensor 24 receives driver signals +O, −O and sends a select signal $SS_{N-1}$ to the selector 22. A backup sensor 26 receives backup driver signals +$B_{N-1}$, −$B_{N-1}$ and sends a backup select signal $BSS_{N-1}$ to the selector 22. The selector 22 has a three signal backup selector output of +$SB_{N-1}$, +$SV_{N-1}$, −$SB_{N-1}$, and receives inputs $T_{N-1}$ and $T_N$ from the transformer card 18 and output module $OM_N$ 14 via the backplane 12. The transformer card 18 has inputs +$SB_{N-2}$, +$SV_{N-2}$, −$SB_{N-2}$, from the previous adjacent output module $OM_{N-2}$ 14. The transformer card 18 generates a synchronization output signal $OUT_{N-1}$.

Either one sensor or two, as shown in FIG. 2, may be used. Either the driver 20 or backup driver 28 or the whole driver assembly 16 can be replaced according to the indicated failure. Failure of either set of signals indicates which driver has failed. The sensor 24 will change a select signal $SS_{N-1}$ from a normal state to a failure state or the backup sensor 26 will change a backup select signal $BSS_{N-1}$ from a normal state to a failure state. When a failure is detected, the previous adjacent output module $OM_{N-2}$ 14 transmits the backup selector output of +$SB_{N-2}$, +$SV_{N-2}$, −$SB_{N-2}$ via the backplane 12 to drive the transformer card 18. The previous adjacent output module $OM_{N-2}$ 14 then generates both synchronization output signals $OUT_{N-1}$ and $OUT_{N-2}$. The selector 22 also isolates the drive signals +O and −O.

The driver 20 may receive a first and a second override signal from the backplane 12 via the interface DAT1. The driver 20 transmits this information to the selector 22 via the interface DAT2. The selector 22 then enables or disables the drive signals +O and −and the backup drive signals +$B_{N-1}$ and −$B_{N-1}$.

Figure 3:
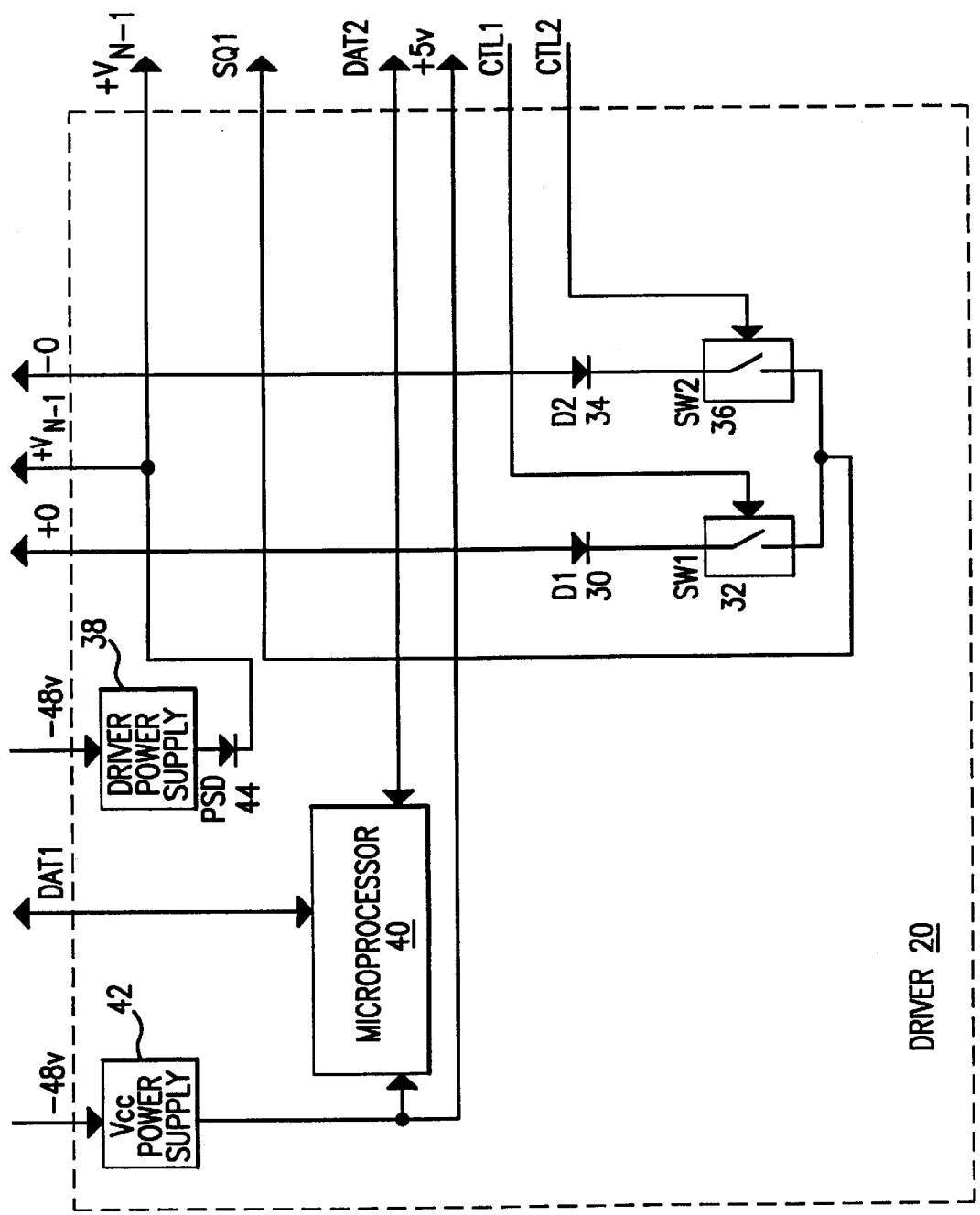
FIG. 3 is a schematic diagram of the driver of FIG. 2.

FIG. 3 shows a schematic diagram of a driver 20 from FIG. 2. A switch SW1 32 connects between the cathode of a first diode D1 30 and the output SQ1. The anode of the first diode D1 30 connects to the output +O. A switch SW2 36 connects between the cathode of a second diode D2 34 and the output SQ1. The anode of the second diode D2 34 connects to the output −O. A driver power supply 38 connects to the anode of a power supply diode PSD 44. The cathode of the power supply diode PSD 44 connects to the +$V_{N-1}$ outputs. A CTL1 input connects to a control line of switch SW1 32. A CTL2 input connects to a control line of switch SW2 36. A microprocessor 40 transmits and receives data with the backplane 12 via the interface DAT1 and with the selector 22 via the interface DAT2. The microprocessor 40 also connects to a Vcc power supply 42. The Vcc power supply 42 generates +5v. The driver and Vcc power supplies 38, 42 have −48v inputs from the backplane 12.

In normal operation, closing switch SW1 32 allows current to flow from the +$V_{N-1}$ output through the transformer card 18 to the +O output. A positive voltage pulse is induced in synchronization output signal $OUT_{N-1}$. Closing switch SW2 36 allows current to flow from the +$V_{N-1}$ output through the transformer card 18 to the -O output. A negative voltage pulse is induced in synchronization output signal $OUT_{N-1}$.

The first and second diodes D1 30, D2 34 protect the transformer from reverse current. The power supply diode PSD 44 protects the driver power supply 38 from reverse current and keeps a shorted driver power supply 38 isolated. Each driver 20 may contain numerous driver circuits that may operate from the one microprocessor 40 and the one set of power supplies 38, 42, only one driver circuit is shown for convenience. The switches SW1 32 and SW2 36 can be field effect transistors (FETs).

Figure 4:
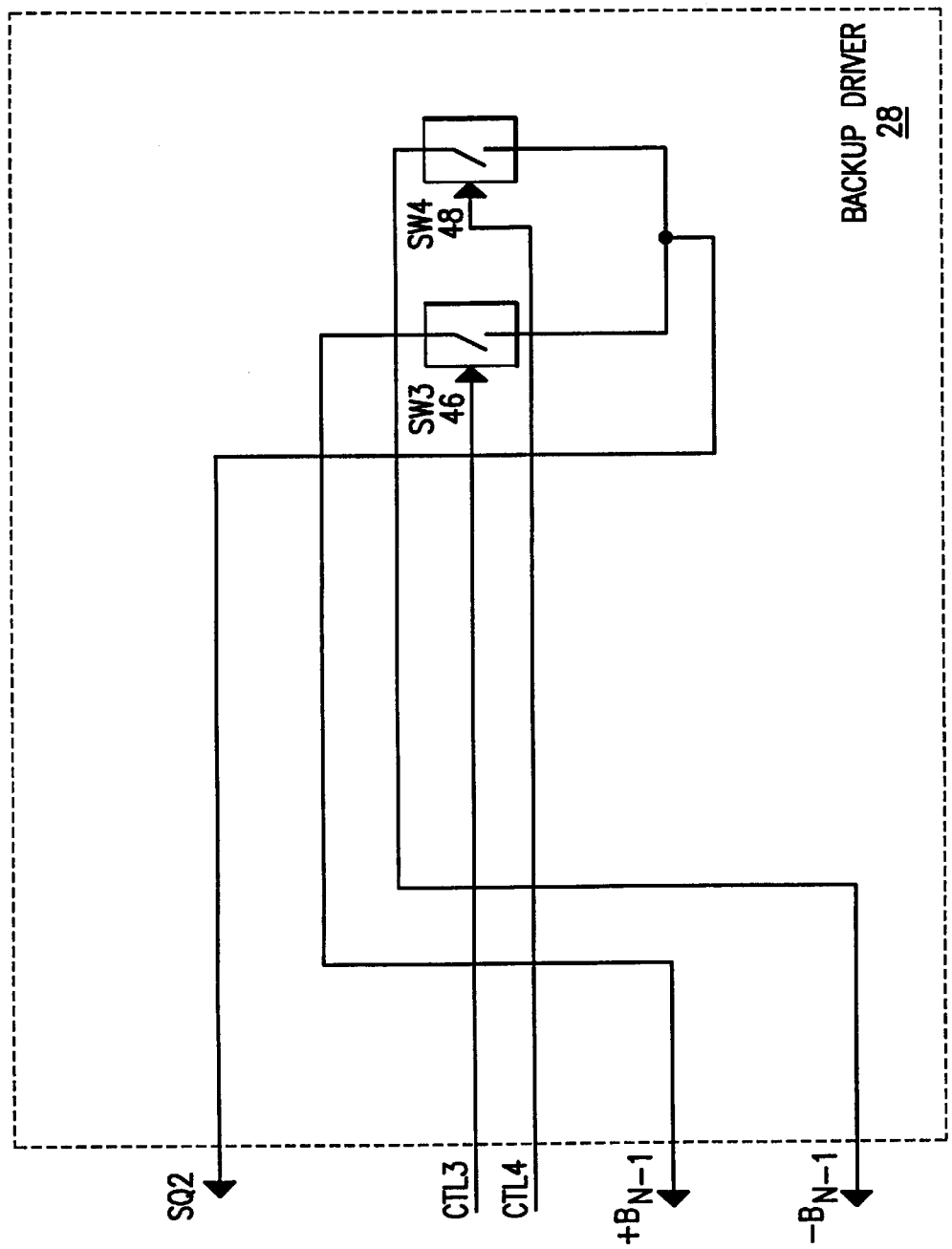
FIG. 4 is a schematic diagram of the backup driver of FIG. 2.

FIG. 4 shows a schematic diagram of a backup driver 28 from FIG. 2. A switch SW3 46 connects between the output +$B_{N-1}$ and the output SQ2. A switch SW4 48 connects between the output −$B_{N-1}$ and the output SQ2. A CTL3 input connects to a control line of switch SW3 46. A CTL4 input connects to a control line of switch SW4 48.

If the next output module $OM_N$ 14 fails, closing switch SW3 46 allows current to flow through output module OMN 14 to the +$B_{N-1}$ output. A positive voltage pulse is induced in synchronization output signal $OUT_N$. Closing switch SW4 48 allows current to flow through output module OMN 14 to the −$B_{N-1}$ output. A negative voltage pulse is induced in synchronization output signal $OUT_N$.

Each output module 14 includes at least one backup driver 28. The switches SW3 46 and SW4 48 can be FETs.

Figure 5:
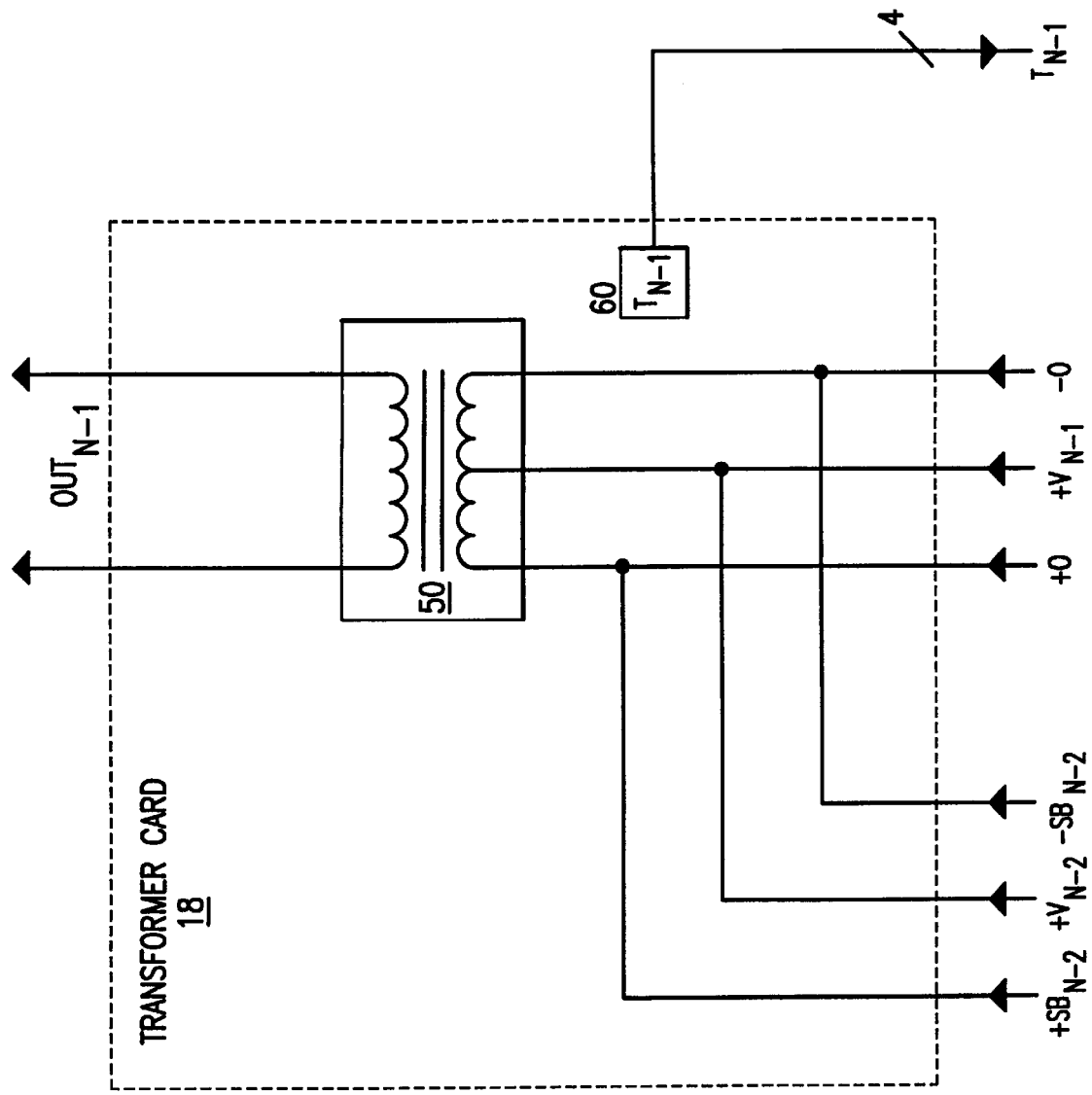
FIG. 5 is a schematic diagram of the transformer card of FIG. 2.

FIG. 5 shows a schematic diagram of a transformer card 18 shown in FIG. 1. A first terminal of a transformer 50 connects to inputs +0 and +$SB_{N-2}$. A center tap of the transformer 50 connects to inputs +$V_{N-1}$ and +$V_{N-2}$. A second terminal of the transformer 50 connects to outputs −O and −$SB_{N-2}$. The transformer 50 generates synchronization output signal $OUT_{N-1}$. The transformer type $T_{N-1}$ 60 connects to output $T_{N-1}$. While the transformer type $T_{N-1}$ 60 may be stored in RAM, in the preferred embodiment, the transformer type $T_{N-1}$ 60 is four signals, each may be grounded or left floating. The selector 22 reads the transformer type $T_{N-1}$ 60 via the backplane 12. Each transformer card 18 contains at least one transformer 50.

Figure 6:
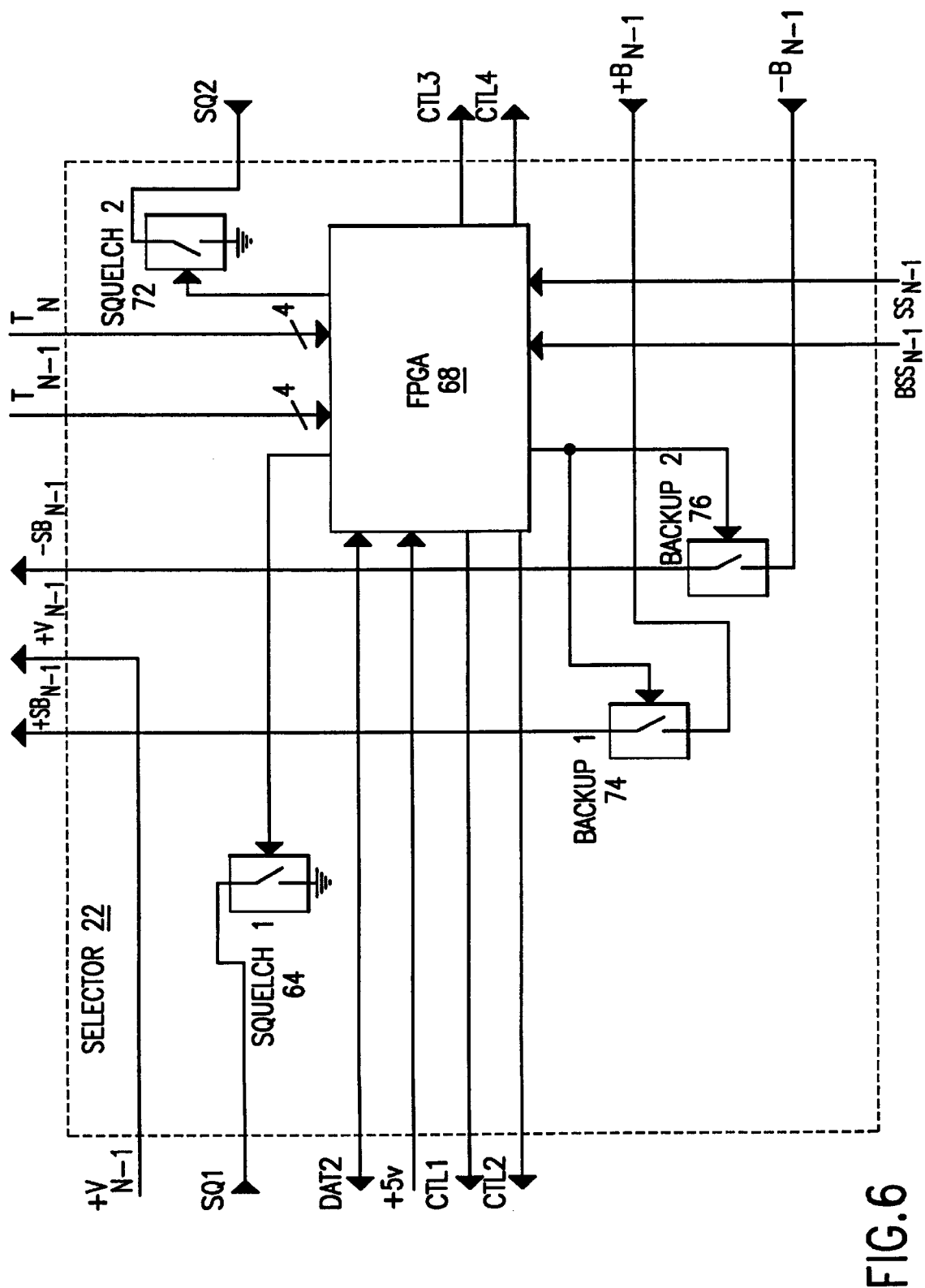
FIG. 6 is a schematic diagram of the selector of FIG. 2.

FIG. 6 shows a schematic diagram of the selector 22 shown in FIG. 2. A squelch 1 switch 64 connects between input SQ1 and ground. A control line of the squelch 1 switch 64 connects to a field programmable gate array (FPGA) 68. A squelch 2 switch 72 connects between the SQ2 input and ground. A control line of the squelch 2 switch 72 connects to the FPGA 68. A backup 1 switch 74 connects between input +$B_{N-1}$ and output +$SB_{N-1}$. A backup 2 switch 76 connects between input −$B_{N-1}$ and output −$SB_{N-1}$. A control line from both backup switches, backup 1 74 and backup 2 76, connect to the FPGA 68. Input +$V_{N-1}$ connects to output +$V_{N-1}$. The FPGA 68 receives and transmits data with the driver 20 via the interface DAT2. The FPGA 68 receives inputs from the transformer card 18 through input $T_{N-1}$, output module $OM_N$ 14 through port $T_N$, the sensor 24 through input $SS_{N-1}$, and the backup sensor 26 through input $BSS_{N-1}$. A +5v input from the driver 20 powers the FPGA 68. The FPGA 68 transmits control signals to the driver 20 and backup driver 28 through ports CTL1, CTL2, CTL3, and CTL4.

The FPGA 68, which contains the control logic for the selector 22, transmits the select signal $SS_{N-1}$ and backup select signal $BSS_{N-1}$ through the DAT2 interface to the previous adjacent output module $OM_{N-2}$ 14 through the backplane 12. Similarly, output module $OM_{N-1}$ 14 receives the state of the driver 20 of the next output module $OM_N$ 14. The FPGA 68 generates the control signals for all the switches in the selector 22. The FPGA 68 reads the transformer type $T_{N-1}$ 60 and transmits the transformer type $T_{N-1}$ 60 to the driver 20 via the interface DAT2. The driver 20 then transmits the transformer type $T_{N-1}$ 60 to a clock card (not shown). The clock card transmits timing signals via the backplane 12 to the driver 20. The driver 20 transmits these timing signals to the FPGA 68 through the interface DAT2. Based on these timing signals and the transformer type $T_{N-1}$ 60, the FPGA 68 generates the control signals CTL1, CTL2 that are transmitted to the driver 20 and determine when switches SW1 32, SW2 36 open and close. The opening and closing of these switches 32, 36 determine the frequency of the driver output. For example, if the driver 20 is driving a transformer 50 with an DS1 output, then this frequency is 1.544 Mb/sec. Similarly, the FPGA 68 reads the transformer type $T_N$ 60 of the next output module $OM_N$ 14 and generates control signals CTL3 and CTL4 for the backup driver 28. Adjacent outputs may be different, for example, the backup driver 28 can be driving a transformer 50 of the next output module OMN 14 with a DS0 output at a frequency of 64 Kb/sec.

The FPGA 68 receives a first and a second override signal, each having an enable and a disable state, from the driver 20 through the interface DAT2. The first override signal $OVRD_{N-1}$ is for the output module $OM_{N-1}$ 14. The second override signal $OVRD_N$ is for the next adjacent output module OMN 14. The FPGA 68 in response to a disabled first override signal $OVRD_{N-1}$ will turn off or send open control signals CTL1, CTL2. This opens driver switches SW1 32, SW2 36 and disables synchronization output signal $OUT_{N-1}$. In response to a disabled second override signal $OVRD_N$ the FPGA 68 turns off the CTL3, CTL4 control signals. This opens backup driver switches SW3 46, SW4 48 and disables the backup for the next output module $OM_N$ 14, which is disabled.

The FPGA 68 logically ANDs the select signal $SS_{N-1}$ with the backup select signal $BSS_{N-1}$ to generate the squelch 1 control signal. If the driver 20 and backup driver 28 are in the normal state, then the squelch 1 switch 64 will close. Otherwise, the squelch 1 switch 64 is open and the ground return is removed from the driver 20. With no ground return to driver switches SW1 32 and SW2 36, the synchronization output signal $OUT_{N-1}$ is squelched. If the driver 20 fails, then the squelch 1 switch 64 is open to isolate the driver 20 from the transformer card 18. This ensures that a shorted driver 20 will not interfere with backup operation and allows the driver assembly 16 to be 'hot' swapped. Alternatively, the squelch 1 switch 64 can also be used to disable the driver 20 in response to the first override signal $OVRD_{N-1}$.

The FPGA 68 controls the squelch 2 switch 72. The FPGA 68 control signal for squelch 2 switch 72 is the logical AND of the select signal $SS_{N-1}$ with the backup select signal $BSS_{N-1}$ Opening the squelch 2 switch 72 removes the ground return from the backup driver 28 through input SQ2. If the driver 20 and backup driver 28 are in the normal state, then the squelch 2 switch 72 is closed and output module $OM_N$ 14 is protected. If either the driver 20 or the backup driver 28 is in the failure state, the squelch 2 switch 72 is open so that the driver assembly 16 can be replaced. Alternatively, the squelch 2 switch 72 can also be used to disable the backup driver 28 in response to the second override signal $OVRD_N$.

The squelch 2 switch 72 can also be used to keep the backup driver 28 in a standby state. The FPGA 68 also receives the select signal $SS_N$ from the next adjacent output module $OM_N$ 14. The FPGA 68 takes the NAND of the select signal $SS_N$ with the backup select signal $BSS_N$ from the next adjacent output module $OM_N$ 14, this signal then ANDs with the select signal $SS_{N-1}$, and with the backup select signal $BSS_{N-1}$ to generate the control signal for the squelch 2 switch 72. The squelch 2 switch 72 will only close if the next adjacent output module $OM_N$ 14 is in the failure state and the driver 20 and backup driver 28 of output module $OM_{N-1}$ 14 is in a normal state. Alternatively, the standby operation can be accomplished by the FPGA 68 sending open control signals CTL3, CTL4, instead of opening squelch 2 switch 72.

The FPGA 68 takes the logical NAND of the next adjacent output module $OM_N$ 14 select signal $SS_N$ with the backup select signal $BSS_N$ to generate the backup control signal. If either the driver 20 or the backup driver 28 of the next adjacent output module $OM_N$ 14 has failed, backup switches, backup 1 74 and backup 2 76, close. Under these conditions, the previous output module $OM_{N-1}$ 14 completely drives the next adjacent transformer card 18 of output module $OM_N$ 14 with backup drive signals $+B_{N-1}$, $+V_{N-1}$, and $-B_{N-1}$. A failure light (not shown) and an optional audible alarm will indicate the failure to the user and a new driver assembly 16 can be 'hot swapped' all with no disruption of service of synchronization output signal $OUT_N$.

The select signal $SS_{N-1}$ and backup select signal $BSS_{N-1}$ may be sent from the FPGA 68 to the backplane 12 via the DAT2 interface, the microprocessor 40, and the DAT1 interface. The information management card (IMC, not shown) receives this data along with information from the other output modules 10. This data may be displayed on a computer monitor (not shown). In some instances, it may be desirable to prevent switch over to backup operation. For instance, if a driver 20 is operating normally, but the backup driver 28 has failed and the previous backup driver 28 has also failed, the FPGA 68 can be programmed not to allow the switch over to occur until the previous backup driver 28 is replaced.

The backup switches, backup 1 74, backup 2 76, and the squelch switches, squelch 1 64, squelch 2 72, can be FETs. In the preferred embodiment, the backup switches, backup 1 74, backup 2 76, are diodes. The backup control signal is unnecessary and switching is nearly instantaneous between backup drive signals $+B_{N-1}$, $-B_{N-1}$ and selector signals $+SB_{N-1}$, $-SB_{N-1}$. These diodes also protect the next adjacent transformer card 18 from reverse current when being backed up by the previous output module $OM_{N-1}$ 14.

The driver 20 protects the transformer 50 and driver power supply 38 against reverse current when Schottky diodes are used as the first diode D1 30, second diode D2 34, and power supply diode PSD 44. Fast switching and constant voltage of the synchronization output signal $OUT_{N-1}$ is achieved with the use of this combination of three Schottky diodes with two Schottky diodes for the backup 1 and backup 2 switches 74, 76. If the next adjacent driver 20 fails in an open state, then the switch to backup operation from the previous output module $OM_{N-1}$ 14 is nearly instantaneous. If the next adjacent driver 20 fails in a closed or shorted state, then the switch to backup operation may take 500 ns. In normal operation, the magnitude of the output pulses is twice the difference of $+V_{N-1}$ minus two Schottky diode drops or $2|+V_{N-1}-0.6|$volts. In failure mode operation, the magnitude of the output pulses is also twice the difference of $+V_{N-1}$ minus two Schottky diode drops or $2|+V_{N-1}-0.6|$volts. When Schottky diodes are used for backup 1 and backup 2 switches 74, 76, the current will flow equally between the switches 46, 48 of the backup driver 28 of the output module $OM_{N-1}$ 14 and the switches 32, 36 of the driver 20 of the next output module $OM_N$ 14. This shared or 'hot' backup operation is preferred. With the backup driver 28 'hot', the backup sensor 26 can detect failures of the diodes used as backup switches, backup 1 74 and backup 2 76. If shared operation is not desired, then fast recovery diodes may be used for backup switches, backup 1 74 and backup 2 76. The higher forward voltage drop across the fast recovery diode than the Schottky diode prevents current sharing during normal operation. Alternatively, the squelch 2 switch 72 or control signals CTL3 and CTL4 can be used to keep the backup driver 28 in standby. In this configuration, the backup driver 28 may be turned on periodically, even in the normal state, to ensure that the backup driver 28 is functioning properly.

The sensor 24 and backup sensor 26 may convey the driver output signals +O, −O and backup driver signals $+B_{N-1}$, $-B_{N-1}$ to the FPGA 68, which compares these signals to the control signals CTL1, CTL2, CTL3, CTL4. Control logic on the FPGA 68 can determine if there is a failure.

The present invention is an elegant solution to achieve modular high performance protection communication outputs. The invention combines utility, speed, and power efficiency with improved heat dissipation, waste reduction, and economy. Ease of use is maintained. Although the invention protects a communication synchronization signal, this method can be used equally well for protecting traffic carrying outputs as well. This invention can be applied to any situation where fast switching in an economical modular unit is desired.

I claim:

1. A communication system having continuous outputs, comprising:
   a series of N driver assemblies, where N is a positive integer $\geq 2$;
      each driver assembly, producing a continuous driver output, including,
         a driver having a driver output,
         a backup driver having a backup driver output,
         a sensor receiving the driver output and generating a select signal having a normal and a failure state, and
         a selector, receiving the driver and backup driver outputs and the select signal, producing a backup selector output; and
      wherein each driver assembly, further receiving a select signal from a next driver assembly in the series and a backup selector output from a previous driver assembly in the series.

2. A communication system, as defined in claim 1, wherein a last driver assembly receives a first select signal and a first driver assembly receives a last backup selector output.

3. A communication system, as defined in claim 1, wherein:
   each driver assembly further comprises,
      a backup sensor, receiving the backup driver output, generating a backup select signal that has a normal and a failure state,
   for each driver assembly, the selector further receives the backup select signal and the backup select signal of the next driver assembly.

4. A communication system, as defined in claim 1, the selector of each driver assembly further comprising:
   a backup switch, connected between the backup driver and the backup selector outputs, receiving the select signal of the next driver assembly;
   wherein the state of the backup switch corresponds to the state of the next driver assembly.

5. A communication system, as defined in claim 4, the selector of each driver assembly further comprising:
   a first squelch switch, connected between the driver and continuous outputs, receiving the select signal;
   wherein the state of the first squelch switch corresponds to the state of the driver assembly.

6. A communication system, as defined in claim 5, wherein the backup switch of the selector of each driver assembly comprises at least one diode.

7. A communication system, as defined in claim 6, wherein the diode is selected from a group consisting of fast recovery and Schottky diodes.

8. A communication system, as defined in claim 5, the selector of each driver assembly further comprising:
   a second squelch switch, connected between the backup driver output and the backup switch, receiving a next override signal that has an on and an off state;
   wherein the state of the second squelch switch corresponds to the state of the next override signal.

9. A communication system, as defined in claim 8, wherein:
   the second squelch switch of each driver assembly, further receiving the select signal of the next driver assembly;
   when the next override signal is off, the second squelch switch is open;
   when the next override signal is on, the state of the second squelch switch corresponds to the state of the next driver assembly.

10. A communication system, as defined in claim 5, wherein:
    the backup switch of each driver assembly, further receiving a next override signal that has an on and an off state;
    when the next override signal is off, the backup switch is open; and
    when the next override signal is on, the backup switch state corresponds to the state of the next driver assembly.

11. A communication system, as defined in claim 10, wherein:
    the first squelch switch of each driver assembly, further receiving an override signal that has an on and an off state;
    when the override signal is off, the first squelch switch is open; and
    when the override signal is on, the first squelch switch state corresponds to the select signal state.

12. A communication system, as defined in claim 5, the selector of each driver assembly further comprising:
    a next backup sensor, receiving the backup driver output of the next driver assembly, outputting a next backup select signal that has a normal and a failure state, to the backup switch;
    when the next backup select signal is in the failure state, the backup switch is closed; and
    when the next backup select signal is in the normal state, the backup switch state corresponds to the state of the select signal of the next driver assembly.

13. A communication system, as defined in claim 12, the selector of each driver assembly further comprising:
    a backup sensor, receiving the backup driver output, outputting a backup select signal that has a normal and a failure state, to the first squelch switch;
    when the backup select signal is in the failure state, the first squelch switch is open; and
    when the backup select signal is in the normal state, the first squelch switch state corresponds to the select signal state.

14. A communication system, as defined in claim 13, the selector of each driver assembly further comprising:
    a second squelch switch, connected between the backup driver output and the backup switch, receiving a next override signal that has an on and an off state and the backup select signal;
    when the next override signal is off, the second squelch switch is open; and
    when the next override signal is on, the second squelch switch state corresponds to the backup select signal state.

15. A communication system, as defined in claim 14, wherein:
    the second squelch switch of each driver assembly, further receiving the select signal of the next driver assembly;
    when the select signal of the next driver assembly is in the normal state, the second squelch switch is open; and
    when the select signal of the next driver assembly is in the failure state and the next override signal is on, the second squelch switch state corresponding to the backup select signal state.

16. A communication system, as defined in claim 13, wherein:
    the backup switch of each driver assembly, further receiving a next override that has an on and an off state;
    when the next override signal is off, the backup switch is open;
    when the override signal is on and one of the select signal of the next driver assembly and next backup select signal is in the failure state, the backup switch is closed; and
    when the override signal is on and the select signal of the next driver assembly and next backup select signal are in the normal state, the backup switch is open.

17. A communication system, as defined in claim 16, wherein:
    the first squelch switch of each driver assembly, further receiving an override signal that has an on and an off state;
    when the override signal is off, the first squelch switch is open;
    when the override signal is on and one of the select and backup select signal is in the failure state, the first squelch switch is open; and
    when the override signal is on and the select and backup select signals are in the normal state, the first squelch switch is closed.

18. A communication system, as defined in claim 1, further comprising:
    N transformer circuits, wherein each transformer circuit receives the corresponding continuous output and generates a respective continuous communication synchronization output signal and the N continuous communication synchronization output signals can be of more than one type.

19. A communication system, as defined in claim 18, wherein the types of communication synchronization output signal are selected from a group consisting of DS0, DS1, RS-422, and E1.

20. A communication system, as defined in claim 18, further comprising:
    N circuit boards, wherein the transformer circuit is mounted on the corresponding circuit board.

* * * * *